(12) United States Patent
Moran et al.

(10) Patent No.: US 11,628,796 B2
(45) Date of Patent: Apr. 18, 2023

(54) CURTAIN AIRBAG DEPLOYMENT RAMP WITH MOUNTING TABS

(71) Applicant: ZF Passive Safety Systems US Inc., Washington, MI (US)

(72) Inventors: Dylan Moran, Rochester Hills, MI (US); Avadhoot Paranjpe, Shelby Township, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/408,656

(22) Filed: Aug. 23, 2021

(65) Prior Publication Data

US 2023/0055794 A1    Feb. 23, 2023

(51) Int. Cl.
*B60R 21/2334* (2011.01)
*B60R 21/213* (2011.01)
*B60R 21/232* (2011.01)

(52) U.S. Cl.
CPC ........ *B60R 21/2334* (2013.01); *B60R 21/213* (2013.01); *B60R 21/232* (2013.01)

(58) Field of Classification Search
CPC . B60R 21/213; B60R 21/232; B60R 21/2334; B60R 2021/161
See application file for complete search history.

(56) References Cited

U.S. PATENT DOCUMENTS

| | | | | |
|---|---|---|---|---|
| 7,097,200 B2* | 8/2006 | Wold | ................... | B60R 21/213 280/730.2 |
| 7,175,196 B2* | 2/2007 | Boxey | ................... | B60R 21/232 280/730.2 |
| 7,182,366 B2* | 2/2007 | Enriquez | ............... | B60R 21/213 280/730.2 |
| 7,328,911 B2* | 2/2008 | Chapman | ............... | B60R 21/217 280/730.2 |
| 7,547,038 B2* | 6/2009 | Coleman | ............... | B60R 21/213 248/225.11 |
| 8,505,961 B2* | 8/2013 | Jakobsson | ............. | B60R 21/232 280/730.2 |
| 9,004,525 B2* | 4/2015 | Ruedisueli | ............ | B60R 21/215 280/730.2 |
| 9,139,151 B2* | 9/2015 | Beppu | ................... | B60R 21/213 |

(Continued)

FOREIGN PATENT DOCUMENTS

JP       2013006539 A   *   1/2013   ............ B60R 21/213

*Primary Examiner* — Laura Freedman

(74) *Attorney, Agent, or Firm* — Tarolli, Sundheim, Covell & Tummino LLP

(57) ABSTRACT

A deployment ramp for helping to direct a curtain airbag to deploy inboard of a trim piece on a side structure of a vehicle includes a deployment flap for directing the curtain airbag to deploy inboard of the trim piece and a mounting portion configured to receive a fastener for connecting the deployment ramp and the curtain airbag to the vehicle. The mounting portion includes a pair of mounting tabs. Each mounting tab is configured to be installed in a corresponding sleeve in the curtain airbag to connect the deployment ramp to the curtain airbag. The mounting portion is configured so that installing both mounting tabs in their corresponding sleeves requires the application of external manipulating forces to the mounting portion in order to bend and/or deflect in order to overcome an interference between the mounting portion and the curtain airbag.

16 Claims, 5 Drawing Sheets

(56) References Cited

U.S. PATENT DOCUMENTS

| | | | | |
|---|---|---|---|---|
| 9,199,598 B2* | 12/2015 | Tsujimoto | ............ | B60R 21/232 |
| 9,487,175 B2* | 11/2016 | Noma | ................... | B60R 21/214 |
| 10,005,419 B2* | 6/2018 | Konaka | ................ | B60R 21/237 |
| 11,254,279 B2* | 2/2022 | Lee | ...................... | B60R 21/213 |
| 2021/0146871 A1* | 5/2021 | Patton | .................. | B60R 21/213 |

* cited by examiner

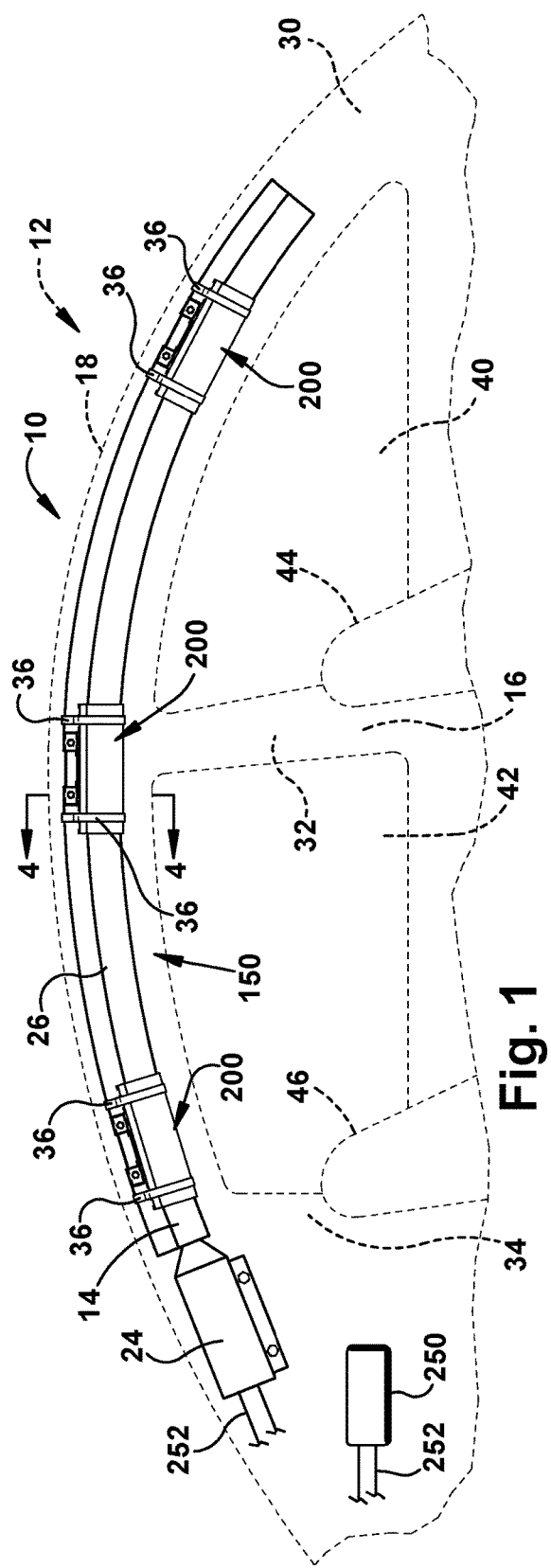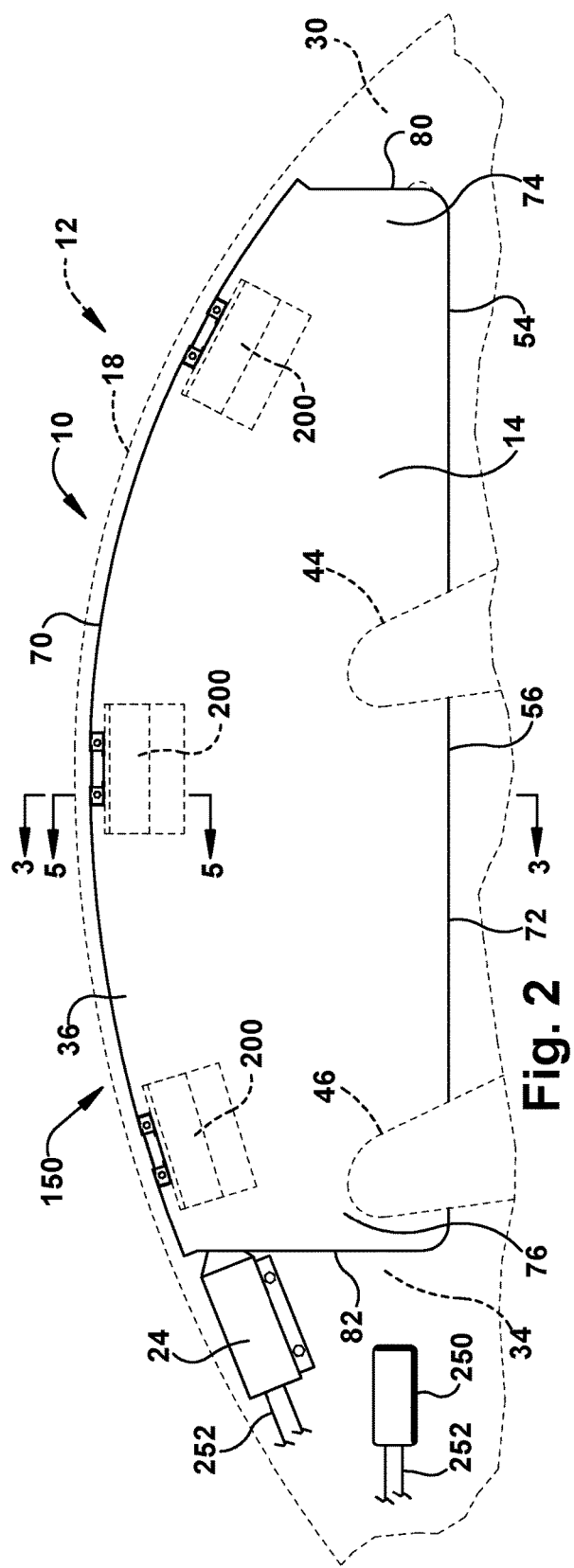

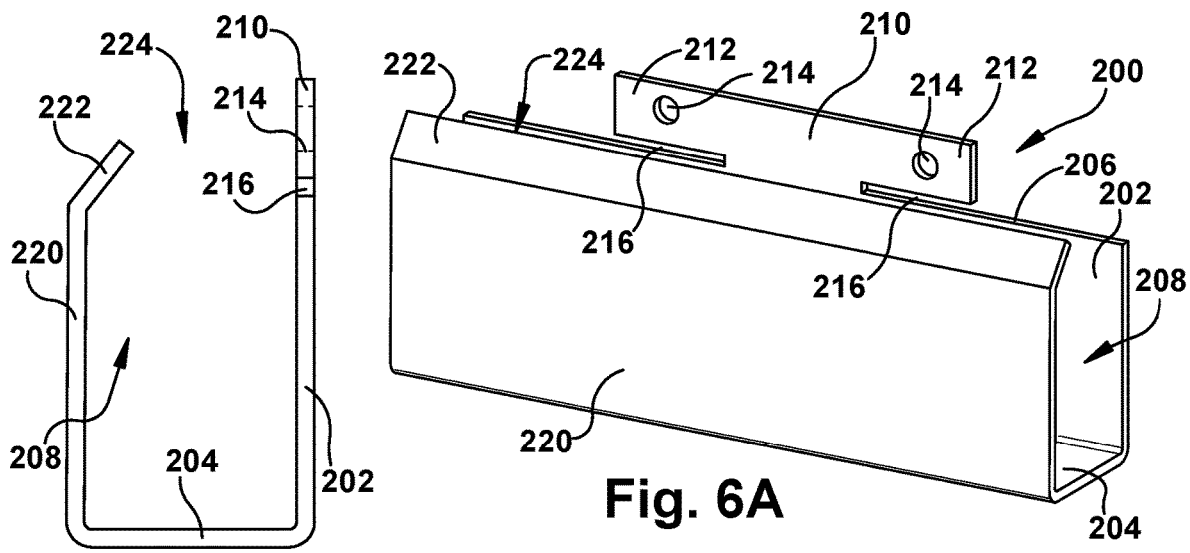
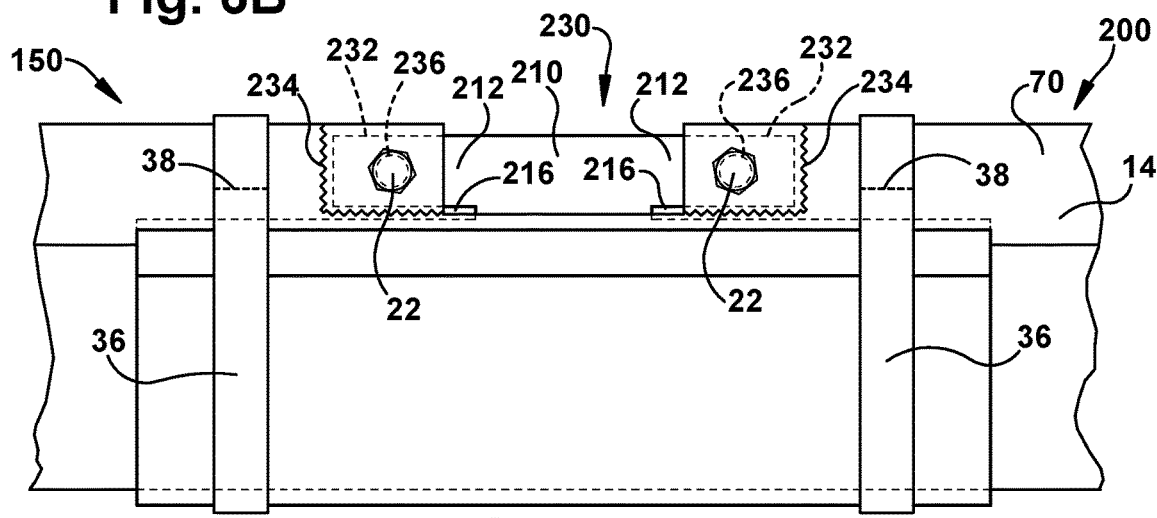
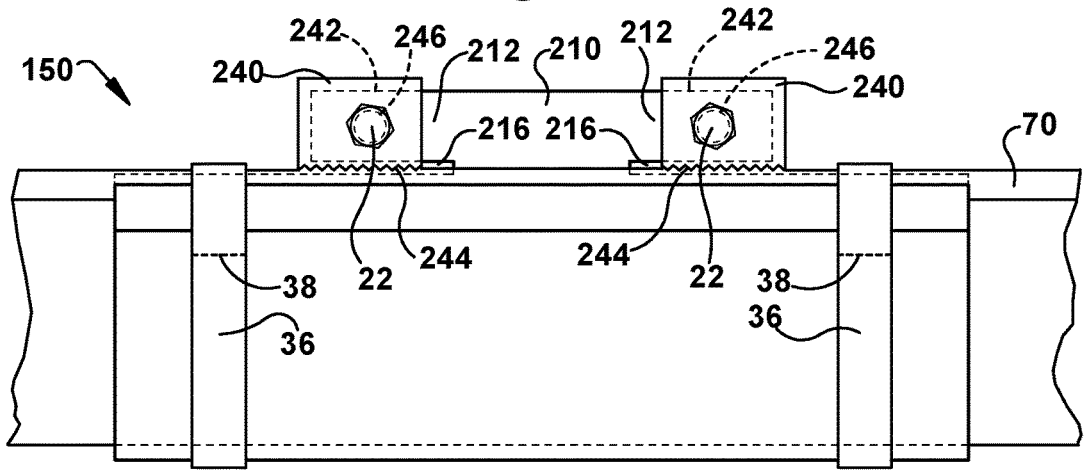

CURTAIN AIRBAG DEPLOYMENT RAMP WITH MOUNTING TABS

TECHNICAL FIELD

This disclosure to an inflatable apparatus for helping to protect a vehicle occupant in the event of a side impact to the vehicle and/or a vehicle rollover. More specifically, this disclosure relates to a deployment ramp for a curtain airbag.

BACKGROUND

It is known to inflate an inflatable vehicle occupant protection device to help protect a vehicle occupant. One particular type of inflatable vehicle occupant protection device is a curtain airbag. The curtain airbag is inflatable away from the roof of the vehicle between a vehicle occupant and the side structure of the vehicle in response to a side impact to the vehicle and/or a vehicle rollover. A known curtain airbag is inflated from a deflated condition with inflation fluid directed from an inflator to the curtain airbag.

SUMMARY

An apparatus helps to protect an occupant of a vehicle that has a roof, a side structure, and a trim piece overlying the side structure. The apparatus includes a curtain airbag that is inflatable away from the vehicle roof to a position adjacent the side structure of the vehicle. The curtain airbag includes a two layer fastener receiving portion formed at or near an upper edge of the curtain airbag and configured to be connected to the vehicle. A deployment ramp helps to direct the curtain airbag to deploy inboard of the trim piece. The deployment ramp includes a tab configured to be inserted into a sleeve defined between the two layer of the fastener receiving portion.

According to one aspect, a deployment ramp for helping to direct a curtain airbag to deploy inboard of a trim piece on a side structure of a vehicle includes a deployment flap for directing the curtain airbag to deploy inboard of the trim piece and a mounting portion configured to receive a fastener for connecting the deployment ramp and the curtain airbag to the vehicle. The mounting portion includes a pair of mounting tabs. Each mounting tab is configured to be installed in a corresponding sleeve in the curtain airbag to connect the deployment ramp to the curtain airbag. The mounting portion is configured so that installing both mounting tabs in their corresponding sleeves requires the application of external manipulating forces to the mounting portion in order to bend and/or deflect in order to overcome an interference between the mounting portion and the curtain airbag.

According to another aspect, the mounting tabs can be configured to extend away from each other According to another aspect, with the mounting tabs installed in their corresponding sleeves, the mounting portion can be configured to return to a non-bent, non-deflected condition due to its own resilience when the external manipulating forces are removed, which reinstates the interference, resulting in the mounting portion being connected to curtain airbag.

According to another aspect, the deployment ramp can include a base wall configured to be positioned against the vehicle structure, and a bottom wall the that extends between and connects the base wall to the deployment flap. The base wall, bottom wall, and deployment flap can help define a channel for receiving the curtain airbag in a stowed condition.

According to another aspect, the mounting portion can extend from the base wall. The mounting tabs can be at least partially defined by one or more slots that extend through the deployment ramp material and space the mounting tabs from the base wall.

According to another aspect, the slots and the mounting tabs can produce a generally T-shaped configuration of the mounting portion.

According to another aspect, each mounting tab can include a fastener aperture, and the mounting tabs can be configured so that the fastener apertures on each mounting tab aligns with fastener apertures in their corresponding sleeves.

According to another aspect, an airbag module can include the deployment ramp, a curtain airbag including sleeves configured to receive the mounting tabs, and fasteners configured to extend through fastener apertures in the mounting tabs and the curtain airbag. The fasteners can further be configured to become aligned when the mounting tabs are installed in their corresponding sleeves, and to connect the curtain airbag and the deployment ramp to the vehicle.

According to another aspect, the curtain airbag can include curtain tabs that extend from an upper edge of the curtain airbag and are spaced apart from each other. The sleeves can be formed in the curtain tabs.

According to another aspect, the mounting tabs, the curtain tabs, and the spacing of the curtain tabs can be configured to form the interference between the mounting portion and the curtain airbag.

According to another aspect, the curtain airbag can include a recess that extends into the upper edge of the curtain airbag. The sleeves can be formed in portions of the curtain airbag on opposite sides of the recess.

According to another aspect, the mounting tabs and the dimensions of the recess can be configured to form the interference between the mounting portion and the curtain airbag.

According to another aspect, the deployment ramp can define a channel for receiving the curtain airbag rolled and/or folded condition. The mounting portion can be configured to be installed in the sleeves from an outboard side of the curtain airbag, which allows the curtain airbag to be rolled and/or folded and placed in the channel.

According to another aspect, the airbag module can also include a wrapping that encircles the deployment ramp with the curtain airbag rolled and/or folded in the channel to maintain the airbag module in a packaged condition. The wrapping can be configured to rupture in response to inflation of the curtain airbag to allow the curtain airbag to inflate and deploy.

According to another aspect, the airbag module can also include an inflator that is actuatable to direct inflation fluid into the curtain airbag to inflate and deploy the curtain airbag.

According to another aspect, a vehicle safety system can include the airbag module, a sensor for sensing vehicle conditions, and a controller that is operative to receive a signal from the sensor that is indicative of the sensed vehicle conditions. The controller can be operative to evaluate the signal from the sensor to identify vehicle crash conditions and to control the actuation of the inflator to inflate and deploy the curtain airbag in response to the identified vehicle crash conditions.

DRAWINGS

The foregoing and other features of the present disclosure will become apparent to one skilled in the art to which the present disclosure relates upon consideration of the following description with reference to the accompanying drawings, in which:

FIG. 1 is a schematic view of an apparatus for helping to protect a vehicle occupant illustrating the apparatus in a deflated and stored condition in a vehicle, according the present invention;

FIG. 2 is a schematic view of the apparatus of FIG. 1 in an inflated condition in the vehicle;

FIG. 6A is a perspective view of a deployment ramp portion of the apparatus;

FIG. 6B is an end view of the deployment ramp portion of the apparatus;

FIG. 7A is a front view of the apparatus with the deployment ramp in a packaged condition, according to one example configuration; and FIG. 7B is a front view of the apparatus with the deployment ramp in a packaged condition, according to another example configuration.

DETAILED DESCRIPTION

Figure 3:
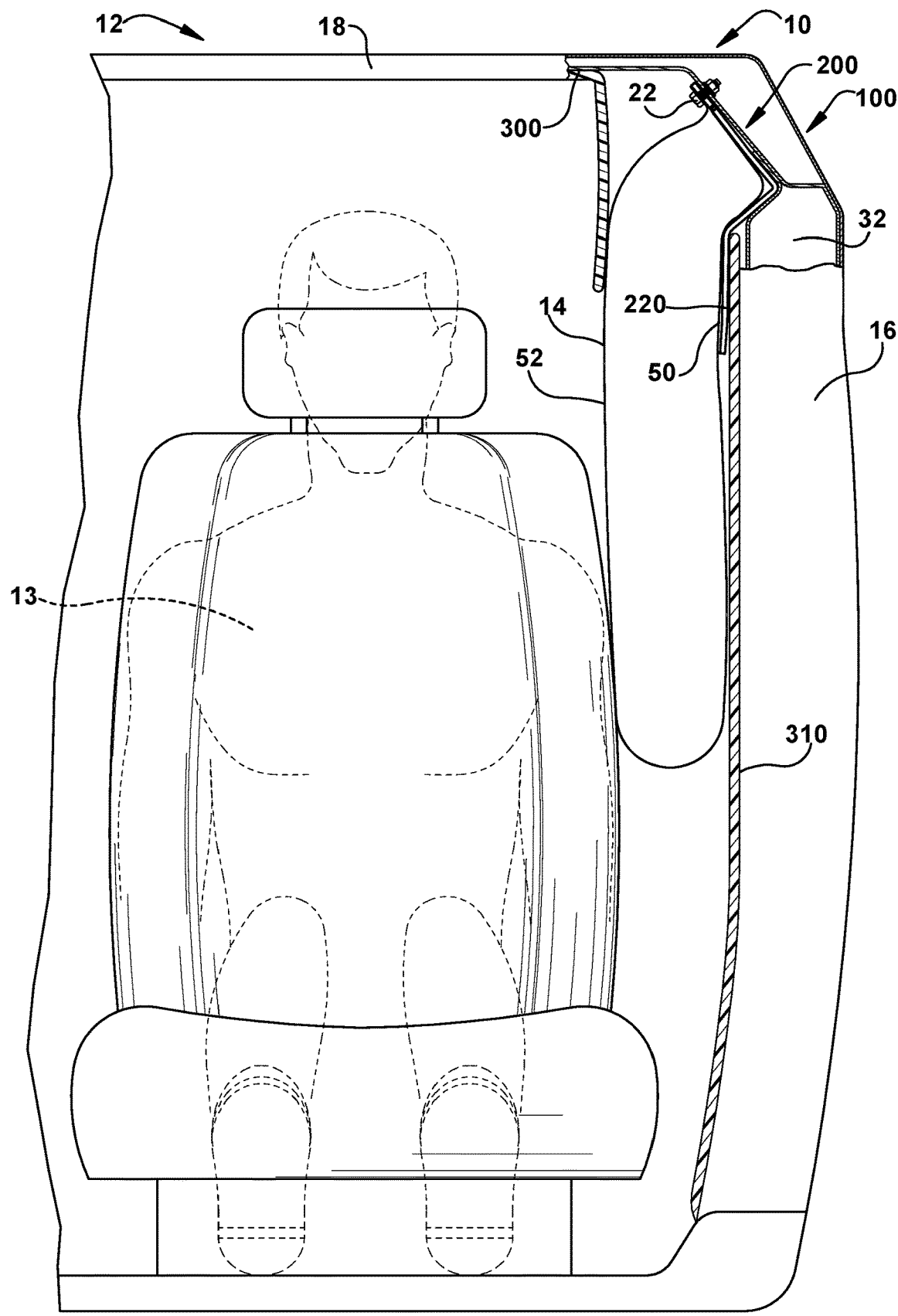
FIG. 3 is a sectional view taken generally along line 3-3 in FIG. 2.

An apparatus 10 helps to protect an occupant 13 of a vehicle 12. As shown in FIGS. 1 and 2, the apparatus 10 includes an inflatable vehicle occupant protection device in the form of a curtain airbag 14 that is mounted adjacent the side structure 16 of the vehicle 12 and the roof 18 of the vehicle. The side structure 16 of the vehicle 12 includes an A pillar 30, a B pillar 32, a C pillar 34, and front and rear side windows 40 and 42. The vehicle 12 also includes front vehicle seating 44 positioned adjacent the front side window 40 and rear vehicle seating 46 positioned adjacent the rear side window 42. This configuration is by way of example only. The vehicle 12 can have any configuration that implements a curtain airbag.

An inflator 24 is connected in fluid communication with the curtain airbag 14. The inflator 24 contains a stored quantity of pressurized inflation fluid in the form of a gas for inflating the curtain airbag 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 24 could be of any suitable type or construction for supplying a medium for inflating the curtain airbag 14.

The apparatus 10 may include a cover 26 (FIG. 1), such as a fabric sheath or plastic housing, that helps support the curtain airbag 14 in a stored and deflated condition. The deflated curtain airbag 14 and the cover 26 have an elongated configuration and extend along the vehicle roof 18 and along the side structure 16 of the vehicle 12 above the side windows 40 and 42. The curtain airbag 14 is connected to the vehicle 12 by fasteners 22 spaced along an upper edge portion 70 of the curtain airbag.

The curtain airbag 14 (FIG. 3) includes panels 50 and 52 of material that are arranged in an overlying manner. Overlapping portions of the panels 50 and 52 are interconnected along at least a portion of a perimeter 54 of the curtain airbag 14 to form a perimeter connection 56 of the curtain. The perimeter connection 56 helps define an inflatable volume of the curtain airbag 14. The curtain airbag 14 may also include interior connections (not shown) in which the overlying panels 50 and 52 are interconnected within the perimeter 54 to form non-inflatable portions that help define inflatable chambers of the curtain.

The curtain airbag 14 may be formed in a variety of manners, such as by weaving the overlying panels 50 and 52 in a one piece woven (OPW) construction in which yarns (e.g., nylon yarns) are woven simultaneously to form both one layer and two layer portions of the airbag. The curtain airbag 14 could alternatively be formed from separately woven panels that are interconnected, for example, by stitching, ultrasonic welding, heat bonding, or adhesives. The curtain airbag 14 may be coated with a gas impermeable material, such as urethane, or laminated with a gas impermeable film. The curtain airbag 14 thus may have a substantially gas-tight construction. Those skilled in the art will appreciate that alternative materials, such as polyester yarn, and alternatives coatings, such as silicone, can also be used to construct the curtain airbag 14.

The perimeter 54 of the curtain airbag 14 is defined at least partially by an upper edge 70, an opposite lower edge 72 of the curtain, and front and rear portions 74 and 76, respectively, of the curtain airbag spaced apart horizontally along the upper and lower edges. The front and rear portions 74 and 76 of the curtain airbag 14 include front and rear edges 80 and 82, respectively, that are spaced horizontally apart along the upper and lower edges 70 and 72 and extend between the upper and lower edges. The shape and dimensions of the curtain airbag 14 can, of course, vary, depending on factors such as the architecture of the vehicle and the desired coverage of the airbag.

Figure 4:
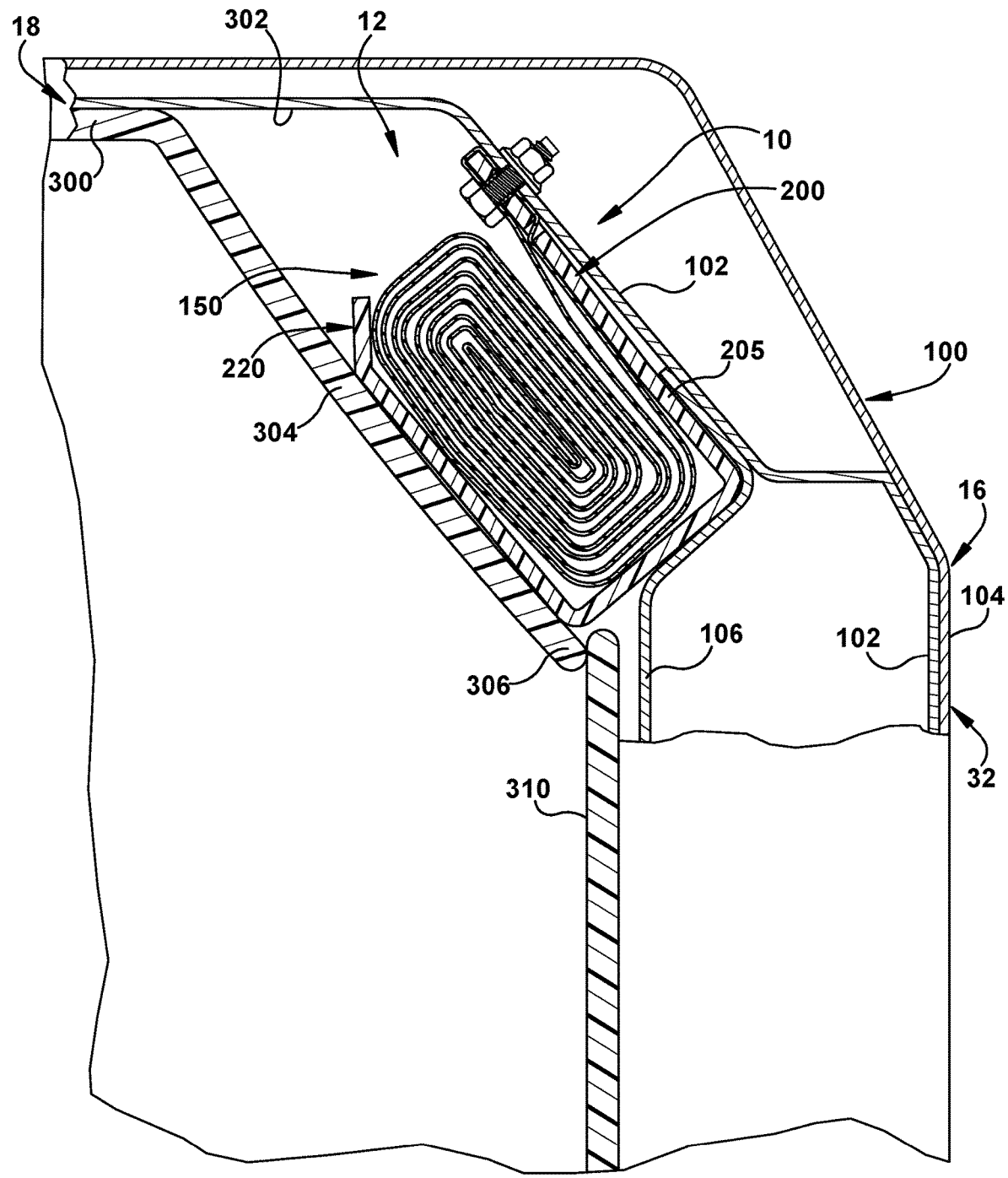
FIG. 4 is a sectional view taken generally along line 4-4 in FIG. 1.
Figure 5:
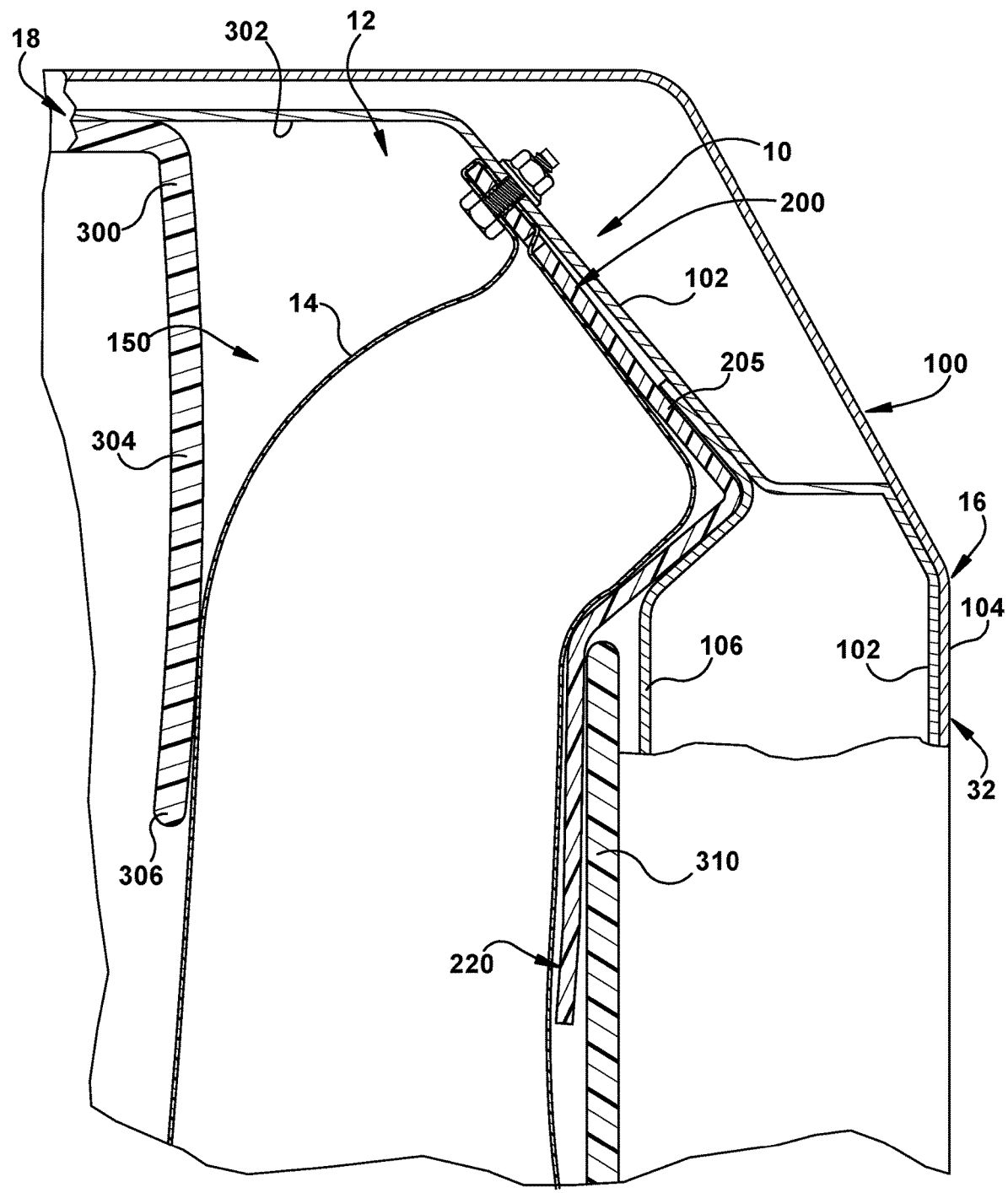
FIG. 5 is a sectional view taken generally along line 5-5 in FIG. 2.

As illustrated in FIGS. 3-5, a vehicle roof rail 100 is located at the intersection of the side structure 16 of the vehicle 12 and the vehicle roof 18. The side structure 16, roof 18, and roof rail 100 are formed from pieces of sheet metal that are stamped or otherwise formed into predetermined shapes and welded or otherwise connected to form a desired vehicle structure. As best shown in FIGS. 4 and 5, inner and outer pieces of sheet metal 102 and 104, respectively, are used to form the side structure 16, roof 18, and roof rail 100. A third piece of sheet metal 106 helps to form the B pillar 32 of the vehicle 12. Those skilled in the art will, however, appreciate that the side structure 16, roof 18, roof rail 100, and B pillar 32 may have alternative constructions.

The curtain airbag 14, inflator 24, and cover 26 (if included) can be assembled as an airbag module 150 that can be installed in the vehicle 12 as a unit. The airbag module 150 is connected to the vehicle 12 by fasteners 22 (see, e.g., FIGS. 3-5 and 6C-D). The airbag module 150 also includes a deployment ramp 200 positioned adjacent the roof rail 100 and the B pillar 32, as illustrated in FIGS. 4-5. The airbag module 150 can also include deployment ramps 200 positioned adjacent the roof rail 100 and the A-pillar 30 and/or adjacent the roof rail and the C-pillar 34 (see FIG. 1).

The deployment ramps 200 help maintain the curtain airbag 14 in a stowed condition prior to deployment, and helps direct the curtain airbag during deployment. The curtain airbag 14, when in the stowed condition, can be rolled, folded, or a combination of rolled and folded. The airbag module 150 may include a retainer 36, such as a band, strap, tether, or tape with a tear seam 38, for holding the deployment ramp 200 in a stored position illustrated in FIG.

4. In this condition, the deployment ramp(s) 200 help package the curtain airbag 14 to form the airbag module 150.

The deployment ramp 200 includes a base wall 202, a deployment flap 220, and a bottom wall 204 that extends between the base wall and the deployment flap. The deployment flap 220 can include a terminal edge 222 turned inward toward the base wall 202. An opening or gap 224 can be defined between the terminal edge 222 and the base wall 202, which can permit access to a channel 208 formed by the deployment ramp 200.

Viewed from the side, the deployment ramp 200 can have a generally rectangular, U-shaped configuration, defining the channel 208, which receives and supports the curtain airbag 14 in the stowed condition. This shape is not limiting, as the deployment ramp 200 can have any configuration tailored to cooperate with the architecture of the vehicle in which it is installed and/or the configuration of the airbag module 150 or the component(s) thereof.

The deployment ramp 200 also includes a mounting portion 210 located along an upper edge 206 of the base wall 202. The mounting portion 210 includes a pair of mounting tabs 212, each of which includes at least one fastener aperture 214. The mounting tabs 212 are partially defined by slots 216 that extend between and separate the mounting tabs from the remainder of the base wall 202. The slots 216 give the mounting portion a generally flattened and widened T-shaped configuration, extending from the upper edge 206 of the base wall 202.

Referring to FIGS. 7A-B, the mounting portion 210 and curtain airbag 14 are configured to cooperate with each other to provide an advantageous mounting of the airbag module 150. In the example configuration of FIG. 7A, the mounting tabs 212 are configured to be installed into corresponding sleeves 232 formed along the upper edge 70 of the curtain airbag 14. The sleeves 232 are formed adjacent a notch 230 that extends into the upper edge 70 of the curtain airbag 14. The notch 230 provides to the sleeves 232, which are located on opposite sides of the notch.

The sleeves 232 are closed pockets formed of two layers of airbag material defined at least partially by a peripheral seam 234. In a OPW construction of the curtain airbag 14, the peripheral seam 234 can be constructed as a single layer of the OPW airbag. In a two panel construction of the curtain airbag 14, the peripheral seam 234 can be formed by any of the forementioned connections, e.g., stitching, ultrasonic welding, etc.

The mounting tabs 212 and the sleeves 232 are configured and dimensioned to accommodate each other with a fit that is sufficiently close/tight to support the curtain airbag 14 on the deployment ramp 200 and vice versa, for installation in the vehicle. To assemble the deployment ramp 200 and curtain airbag 14, one of the mounting tabs 212 is installed into its corresponding sleeve 232. The mounting portion 210 then can be bent or otherwise manipulated to allow the remaining mounting tab 212 to be inserted into its corresponding sleeve 232. The installation of the mounting tabs 212 into the sleeves 232 is done so that the curtain airbag 14 is positioned in front of the base wall 202 (i.e., inboard of the base wall when installed in the vehicle, see, e.g., FIG. 4).

When the mounting tabs 212 are installed in the sleeves 232, fastener apertures 236 in the airbag fabric forming the sleeves align with the fastener apertures 214 (see, FIGS. 6A-B) in the mounting tabs. The fasteners 22 can be installed through these aligned fastener apertures 214, 234 and installed in the vehicle structure to connect these components, and the airbag module 150 to the vehicle 12. Advantageously, the inclusion of the mounting tabs 212 with the mounting portion 210 eliminates the need for separate mounting components, such as mounting clips or brackets, for facilitating the connection via the fasteners 22. The mounting tabs 212 and the apertures 214 can be configured to allow for installing and retaining the fasteners 22 prior to installation of the curtain airbag module 150 in the vehicle 12.

In the example configuration of FIG. 7B, the notch in the upper edge 70 of the curtain airbag 14 is eliminated. In this example configuration, sleeves 242 are formed in curtain tabs 240 that extend from the upper edge 70 of the curtain airbag 14. The sleeves 242 can be closed pockets or open at both ends and can be connected to or defined by a seam 244 that extends along a portion of their peripheries. In a OPW construction of the curtain airbag 14, the peripheral seam 244 can be constructed as a single layer of the OPW airbag. In a two panel construction of the curtain airbag 14, the peripheral seam 244 can be formed by any of the forementioned connections, e.g., stitching, ultrasonic welding, etc. The curtain tabs 240 can be formed integrally with the remainder of the curtain airbag 14 or as separate pieces connected to the upper edge 70, again by any of the aforementioned connections.

The mounting tabs 212 and the curtain tabs 240 and/or sleeves 242 are configured and dimensioned to accommodate each other with a fit that is sufficiently close/tight to support the curtain airbag 14 on the deployment ramp 200 and vice versa, for installation in the vehicle. To assemble the deployment ramp 200 and curtain airbag 14, one of the mounting tabs 212 is installed into its corresponding sleeve 242. The mounting portion 210 then can be bent or otherwise manipulated to allow the remaining mounting tab 212 to be inserted into its corresponding sleeve 242. The installation of the mounting tabs 212 into the sleeves 242 is done so that the curtain airbag 14 is positioned in front of the base wall 202 (i.e., inboard of the base wall when installed in the vehicle, see, e.g., FIG. 4).

Advantageously, the configuration of FIG. 7B, having the curtain tabs 240 extending from the upper edge 70 of the curtain airbag 14, allows the sleeves to have an open, pass-through configuration extending through the widths of the curtain tabs. According to this open, pass-through configuration, the mounting tabs 212 and curtain tabs 240 can advantageously be spaced and dimensioned to allow the mounting tabs to extend through the sleeves 242 during installation. Advantageously, this feature can be utilize to tailor the degree of manipulation and deflection of the mounting tabs 212 necessary to install the mounting tabs in the sleeves. For example, the sleeves 242 and mounting tabs 212 can be configured so that the first mounting tab inserted into its corresponding sleeve extends through the sleeve to a degree where installing the remaining mounting tab requires only a predetermined degree of manipulation/deflection for installation in its sleeve. This produces a predetermined degree of interference that retains the deployment ramp 200 connected to the curtain airbag 14. Thereafter, the fastener apertures 214 and 236 can be aligned and the retainer 36 can be installed to secure the deployment ramp 200 to the packaged curtain airbag 14, thus helping to produce the airbag module 150 in a ready-for-installation condition.

When the mounting tabs 212 are installed in the sleeves 242, fastener apertures 246 in the airbag fabric forming the sleeves align with the fastener apertures 214 (see, FIGS. 6A-B) in the mounting tabs. The fasteners 22 can be installed through these aligned fastener apertures 214, 246 and installed in the vehicle structure to connect these components, and the airbag module 150 to the vehicle 12. Advantageously, the inclusion of the mounting tabs 212 with the mounting portion 210 eliminates the need for separate mounting components, such as mounting clips or brackets, for facilitating the connection via the fasteners 22. The mounting tabs 212 and the apertures 214 can be configured to allow for installing and retaining the fasteners 22 prior to installation of the curtain airbag module 150 in the vehicle 12.

Advantageously, due to the generally T-shaped, two mounting tab configuration of the deployment ramp 200, there is a self-retaining connection between the deployment ramp and the curtain airbag 14 when the mounting tabs 212 are inserted in the sleeves 232, 242. The spacing of the sleeves 232, 242 creates an interference that necessitates the mounting portion 210, particularly one or both of the mounting tabs 212, to be manipulated to bend and/or deflect the mounting portion 210 during assembly in order to insert the mounting tabs 212 in their respective sleeves 232, 242. The application of these external manipulating forces (e.g., through manual manipulation "by hand") allows the mounting tabs 212 to be guided and inserted into their respective sleeves 232, 242. Once the mounting tabs 212 are inserted in the sleeves 232, 242 and the manipulating forces are released, the mounting tabs return to their non-bent/non-deflected conditions due to the resilient nature of the material (e.g., plastic) used to construct the deployment ramp 200.

When the mounting portion 210 returns to its non-bent/non-deflected condition, the interference between the sleeves 232, 242 and the mounting tabs 212 is reinstated, and the mounting portion 210 is connected to the curtain airbag 14. In this state, the mounting portion 210 cannot be disconnected from the curtain airbag 14 without again overcoming the interference by bending or deflecting the mounting portion, e.g., the mounting tabs 212. The deployment ramp 200 is therefore connected to the curtain airbag 14 simply by installing the mounting tabs 212 in the sleeves 232, 242, and no further steps or devices are necessary to maintain this connection, which is advantageous because the connection helps maintain the relative positioning of the components during further assembly of the airbag module 150.

Considering this advantageous configuration, it will be appreciated that the mounting tabs 212 could have alternative, non-T-shaped configurations. For example, the mounting tabs could have a configuration where the mounting tabs extend in a non-opposite direction or even the same direction. In any configuration, the mounting tabs are configured such that installing the mounting tabs in their corresponding sleeves requires the application of external manipulating forces to the mounting portion in order to bend and/or deflect in order to overcome an interference between the mounting portion and the curtain airbag.

The deployment ramp 200 is constructed of a material, such as plastic, that is flexible, but also can be tailored to have a desired degree of resiliency or stiffness. The deployment ramp 200 can therefore be configured to contain and support the curtain airbag 14 in the stowed condition, and also to open and aid in the deployment of the airbag, as described below. While the deployment ramp 200 possesses these flexible and resilient qualities, it is also strong, especially in tension. Therefore, while the deployment ramp 200 performs the stowage and deployment features described herein, it is also beneficial in providing a strong, durable, and reliable connection of the curtain airbag 14 to the vehicle 12.

The airbag module 150, when in the installed condition of FIGS. 1 and 4, extends along the roof rail 100 and along the intersection of the side structure 16 and the roof 18. The vehicle 12 includes a headliner 300 that extends along an inner surface 302 of the roof 18 of the vehicle. The headliner 300 has a portion 304 that extends at an acute angle relative to the roof 18 adjacent the airbag module 150. The portion 304 of the headliner 300 overlies the airbag module 150 and conceals the airbag module in the vehicle 12. A terminal end 306 of the headliner 300 is in abutting engagement with a trim piece 310 (FIG. 4) overlying the B pillar 32. Those having skill in the art will appreciate that the headliner 300 may also abut and engage a trim piece (not shown in FIG. 4, see FIG. 1) overlying the C pillar 34.

Those skilled in the art will recognize that the configuration of the vehicle structure and, thus, the spatial and interconnecting relationships between the vehicle structure (i.e., the side structure 16, roof 18, and roof rail 100) and the headliner 300, trim piece 310, and airbag module 150, may vary depending upon the particular design of the vehicle 12. Therefore, it should be recognized that the vehicle structure illustrated in FIGS. 4-5 and the spatial and interconnecting relationships between the vehicle structure and the headliner 300, the trim pieces 310 and 312, and the airbag module 150 are for illustrative purposes and may vary without departing from the spirit of the present invention.

The vehicle 12 includes a sensor mechanism 250 (shown schematically in FIGS. 1 and 2) for sensing the occurrence of an event for which inflation of the curtain airbag 14 is desired, such as a side impact to the vehicle 12 and/or a vehicle rollover. Upon sensing the occurrence of such an event, the sensor mechanism 250 provides an electrical signal over lead wires 252 to the inflator 24. The electrical signal causes the inflator 24 to be actuated in a known manner. The inflator 24, when actuated, discharges fluid under pressure into the curtain airbag 14.

The curtain airbag 14 inflates under the pressure of the inflation fluid from the inflator 24. This causes the cover 26 (if included) to open. At the same time, the retainer 36 ruptures at the tear seam 38, which permits the deployment flap 220 to open and the curtain airbag 14 to inflate away from the roof 18 in a downward direction as shown in the drawings and in a downward direction with respect to the direction of forward travel of the vehicle 12 into the position illustrated in FIGS. 2 and 5.

The curtain airbag 14, when inflated, extends along the side structure 16 of the vehicle 12 and is positioned between the side structure and any occupant 13 of the vehicle. The curtain airbag 14 covers portions of the vehicle side structure that extend between the A pillar 30 and the C pillar 34 of the vehicle 12 and may overlie portions of the A pillar, C pillar, and the B pillar 32 of the vehicle. The curtain airbag 14, when inflated, may be positioned between the vehicle side structure 16 and the front and rear vehicle seating 44 and 46. The curtain airbag 14, when inflated, helps to protect a vehicle occupant 13 in the event of a vehicle rollover or a side impact to the vehicle 12. The curtain airbag 14, when inflated, also helps to absorb the energy of impacts with the curtain and helps to distribute the impact energy over a large area of the curtain.

Those skilled in the art will appreciate that the extent and coverage of the curtain airbag 14 in the vehicle 12 may vary. For example, the extent and coverage of the curtain airbag 14 may vary depending on a variety of factors, such as the architecture of the vehicle 12, the position of the curtain airbag in the vehicle, and the desired extent or coverage of the curtain airbag.

Referring to FIGS. 4 and 5, the deployment ramp 200 helps to deflect or otherwise direct the curtain airbag 14 to inflate inboard of the trim piece 310, between the trim piece and occupants of the vehicle 12. During inflation of the curtain airbag 14, the flexible deployment flap 220 permits the deployment ramp 200 to move from the stored position of FIG. 4 toward the deployed position of FIG. 5. The construction of the deployment flap 220 is sufficiently resilient and flexible so as to permit substantially unrestricted downward movement of the deployment flap. This allows the deployment flap 220 to reach the deployed position quickly and with little resistance so that the curtain airbag 14 may also deploy quickly and with little or no resistance. The deployment flap 220, when deployed, extends inboard of the trim piece 310 and overlies the area where the trim piece and the side structure 16 converge.

The deployment ramp 200 therefore provides a barrier between the curtain airbag 14 and the trim piece 310 and, thus, helps prevent the curtain from getting caught on the trim piece or inflating between the trim piece and the side structure 16. The deployment ramp 200 directs the curtain airbag 14 to deploy in an inboard direction (i.e., to the left as viewed in FIGS. 3-5) around and inboard of the trim piece 310. As shown in FIG. 5, the deployment flap 220 may bend or flex under the force of the inflated curtain 14. Even under such bending or flexure, however, the deployment flap 220 is of sufficient rigidity to direct the curtain airbag 14 inboard of the trim piece 310.

From the above description of the invention, those skilled in the art will perceive improvements, changes and modifications. Such improvements, changes and modifications within the skill of the art are intended to be covered by the appended claims.

Having described the invention, the following is claimed:

1. A deployment ramp for helping to direct a curtain airbag to deploy inboard of a trim piece on a side structure of a vehicle, the deployment ramp comprising:
   a deployment flap for directing the curtain airbag to deploy inboard of the trim piece; and
   a mounting portion configured to receive a fastener for connecting the deployment ramp and the curtain airbag to the vehicle, the mounting portion comprising a pair of mounting tabs, wherein each mounting tab is configured to be installed inside a corresponding sleeve in the curtain airbag to connect the deployment ramp to the curtain airbag;
   wherein the mounting portion is configured so that installing both mounting tabs in their corresponding sleeves requires the application of external manipulating forces to the mounting portion in order to bend and/or deflect the mounting tabs in order to overcome an interference between the mounting portion and the curtain airbag.

2. The deployment ramp recited in claim 1, wherein the mounting tabs are configured to extend away from each other.

3. The deployment ramp recited in claim 1, wherein, with the mounting tabs installed in their corresponding sleeves, the mounting portion is configured to return to a non-bent, non-deflected condition due to its own resilience when the external manipulating forces are removed, which reinstates the interference, resulting in the mounting portion being connected to curtain airbag.

4. The deployment ramp recited in claim 1, wherein the deployment ramp comprises a base wall configured to be positioned against the vehicle structure, and a bottom wall that extends between and connects the base wall to the deployment flap, wherein the base wall, bottom wall, and deployment flap help define a channel for receiving the curtain airbag in a stowed condition.

5. The deployment ramp recited in claim 4, wherein the mounting portion extends from the base wall, the mounting tabs being at least partially defined by one or more slots that extend through material forming the deployment ramp and space the mounting tabs from the base wall.

6. The deployment ramp recited in claim 5, wherein the slots and the mounting tabs produce a generally T-shaped configuration of the mounting portion.

7. An airbag module comprising:
   the deployment ramp of claim 1;
   the curtain airbag comprising the sleeves configured to receive the mounting tabs; and
   the fasteners configured to extend through fastener apertures in the mounting tabs and the curtain airbag that become aligned when the mounting tabs are installed in their corresponding sleeves, the fasteners being configured to connect the curtain airbag and the deployment ramp to the vehicle.

8. The airbag module recited in claim 7, wherein the curtain airbag comprises curtain tabs that extend from an upper edge of the curtain airbag and are spaced apart from each other, the sleeves being formed in the curtain tabs.

9. The airbag module recited in claim 8, wherein the mounting tabs, the curtain tabs, and the spacing of the curtain tabs are configured to form the interference between the mounting portion and the curtain airbag.

10. The airbag module recited in claim 7, wherein the curtain airbag comprises a recess that extends into an upper edge of the curtain airbag, the sleeves being formed in portions of the curtain airbag on opposite sides of the recess.

11. The airbag module recited in claim 10, wherein the mounting tabs and the dimensions of the recess are configured to form the interference between the mounting portion and the curtain airbag.

12. The airbag module recited in claim 7, wherein the deployment ramp defines a channel for receiving the curtain airbag in a rolled and/or folded condition, and wherein the mounting portion is configured to be installed in the sleeves from an outboard side of the curtain airbag, which allows the curtain airbag to be rolled and/or folded and placed in the channel.

13. The airbag module recited in claim 12, further comprising a wrapping that encircles the deployment ramp with the curtain airbag rolled and/or folded in the channel to maintain the airbag module in a packaged condition, the wrapping being configured to rupture in response to inflation of the curtain airbag to allow the curtain airbag to inflate and deploy.

14. The airbag module recited in claim 7, further comprising an inflator that is actuatable to direct inflation fluid into the curtain airbag to inflate and deploy the curtain airbag.

15. A vehicle safety system comprising the airbag module of claim 14, a sensor for sensing vehicle conditions, and a controller that is operative to receive a signal from the sensor that is indicative of the sensed vehicle conditions, the controller being operative to evaluate the signal from the sensor to identify vehicle crash conditions and to control the actuation of the inflator to inflate and deploy the curtain airbag in response to the identified vehicle crash conditions.

16. A deployment ramp for helping to direct a curtain airbag to deploy inboard of a trim piece on a side structure of a vehicle, the deployment ramp comprising:
   a deployment flap for directing the curtain airbag to deploy inboard of the trim piece; and a mounting portion configured to receive a fastener for connecting the deployment ramp and the curtain airbag to the vehicle, the mounting portion comprising a pair of mounting tabs, wherein each mounting tab is configured to be installed in a corresponding sleeve in the curtain airbag to connect the deployment ramp to the curtain airbag;

wherein the mounting portion is configured so that installing both mounting tabs in their corresponding sleeves requires the application of external manipulating forces to the mounting portion in order to bend and/or deflect in order to overcome an interference between the mounting portion and the curtain airbag, wherein each mounting tab comprises a fastener aperture, and wherein the mounting tabs are configured so that the fastener aperture on each mounting tab aligns with fastener apertures in their corresponding sleeves.

\* \* \* \* \*